Nov. 12, 1940.  W. C. SUTTON  2,221,696

APPARATUS FOR FORMING A WOVEN WIRE BELT

Filed Sept. 21, 1939  5 Sheets-Sheet 1

INVENTOR.
Walter C. Sutton
BY
ATTORNEYS.

Nov. 12, 1940.  W. C. SUTTON  2,221,696

APPARATUS FOR FORMING A WOVEN WIRE BELT

Filed Sept. 21, 1939  5 Sheets—Sheet 5

INVENTOR.
Walter C. Sutton,
BY Baker, Golrick & Tears
ATTORNEYS.

Patented Nov. 12, 1940

2,221,696

UNITED STATES PATENT OFFICE 2,221,696

APPARATUS FOR FORMING A WOVEN WIRE BELT

Walter C. Sutton, Shaker Heights, Ohio, assignor to The Lindsay Wire Weaving Company, Cleveland, Ohio, a corporation of Ohio Application September 21, 1939, Serial No. 295,993

39 Claims. (Cl. 140—3)

This invention relates to an apparatus for forming a woven wire belt suitable for use in Fourdrinier machines.

Woven wire fabric, when used as a belt on paper-making machines, is rapidly and repeatedly bent in opposite directions as it passes over the various rolls and suction boxes of the machine. Such reverse bending imparts stresses to the fabric which are so severe that the life of a belt which is made in the customary manner of weaving, averages only about thirty days.

Firmness is an essential quality in the Fourdrinier wire belt. Sleaziness or looseness of the fabric tends to cause wrinkling and shorter operating life. Twill weave fabric is more susceptible to sleaziness than the older plain weave wire cloth, although it has other advantages, as outlined below, which make it valuable for many machines.

One of the advantages of twill weave over plain weave is the fact that more wearing surface is available on that side of the belt which is subject to the abrasive action of the suction boxes. In twill weave, each warp wire passes over one weft wire, and under two weft wires in succession, but so far as I am aware, no one has been able to so weave a twill fabric that the underlying portion of the warp wires extend parallel to the plane of the top surface on the suction boxes; instead, the under portion of each warp wire has extended at an angle to the surface of the suction box and consequently has formed a knuckle which takes the initial wear. The area of the knuckle so formed is considerably smaller than the area of the entire underlying portion of each warp wire and hence the wear is concentrated, and the warp wires have been worn through prematurely.

The disadvantage of the twill weave, however, is the fact that a paper web formed on the twill is marked more than that formed on a plain weave, because the weft knuckles are more widely spaced and do not rise to the plane of the top of the warp knuckles in the normal weaving operation; but the co-planar relationship of the warp and weft knuckles has been improved by beating up the weft wires to a greater degree. Such action has increased the pressure against the warp wires, accentuating the angularity of the underlying portions of the warp wires, so that a gain in smoothness on the top surface of the belt has been commensurate with a loss in available wearing surface on the bottom of the belt.

An object of my invention is to make a wire fabric which is firmer and more compact than that obtained merely from a weaving operation, and which will therefore possess greater mechanical strength and resistance to fracture from successive bending in reverse directions.

An additional object is to make a fabric which, when woven as a twill weave, will have the top of the warp and weft knuckles in the same plane and will have the underlying portions of the warp wires disposed for substantially their entire length parallel to the plane in which the topmost surfaces of the belt lie, and therefore parallel to the plane of the wearing surface of the suction boxes.

Flattening or leveling of the cloth as a whole improves its performance on both the upper and under-surface, as it makes a more level support for the paper, and less abrasion of the suction boxes. To effect such leveling, it has been proposed to submit the woven fabric to pressure between rotating rolls, which have been supported at their ends in journal boxes pressed toward the fabric. So far as I am aware, this method has not been successful for wide wires, because no alteration in the position of the wires in the fabric could be obtained without the application of a comparatively heavy pressure, and when adequate pressure was applied, the rolls which would necessarily be quite long, since wires may be as much as 25 feet wide, would deflect in the intermediate region and thus only press the fabric sufficiently to flatten it in the region of its margins, without altering the formation in the central region. The permissible flattening is only a few thousandths of an inch, and it has been found that a deflection of the roll greater than about a thousandth of an inch renders the operation useless.

It has also been proposed to roll the wire cloth transversely, a narrow strip at a time, before the ends are joined. This method has introduced unevenness in the junction of the rolled zones and has interfered with the proper formation of the seam when the ends were joined into a belt, and has other disadvantages, so that it has never come into common use.

The present invention provides means for flattening wire cloth of any width, using equipment already available with the additional parts; requires only moderate power for its operation, and provides absolutely uniform pressure, flattening the fabric across the entire web with moderate flattening of the individual wires. The cloth is rolled after seaming as an endless belt, and the disadvantages of former attempted methods are overcome.

This feature of the present invention may therefore be characterized as providing an apparatus for treating woven wire fabric so as to accomplish the desired leveling without damaging the fabric or interferring with its utility.

Referring now to the drawings.

Figure 1:
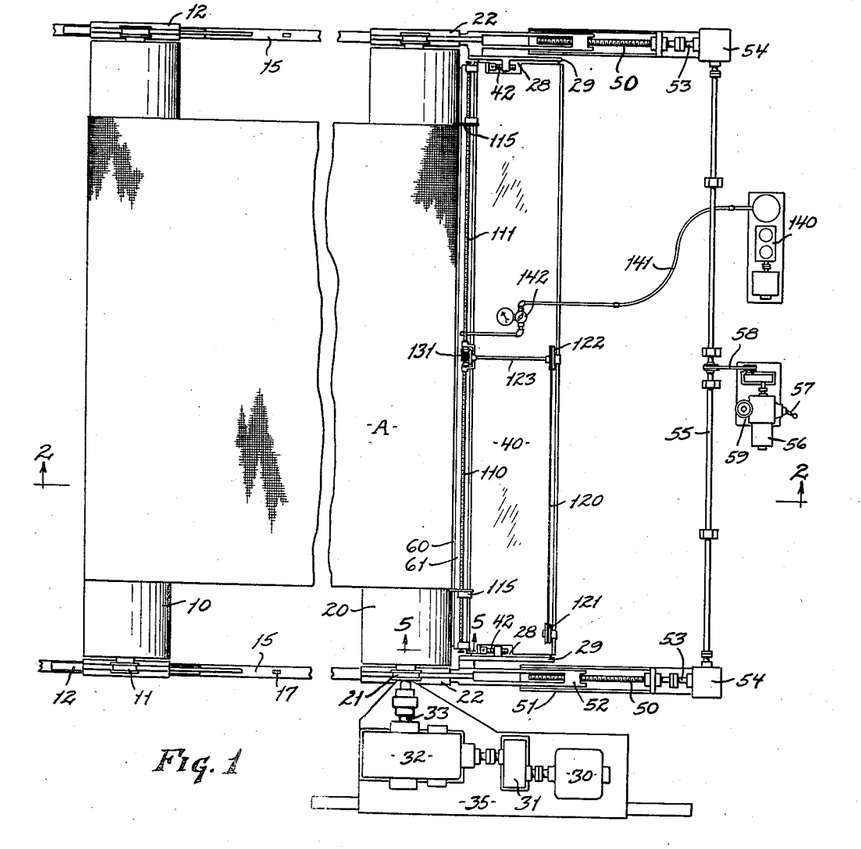
Fig. 1 is a top plan view of an apparatus embodying my invention.
Figure 2:
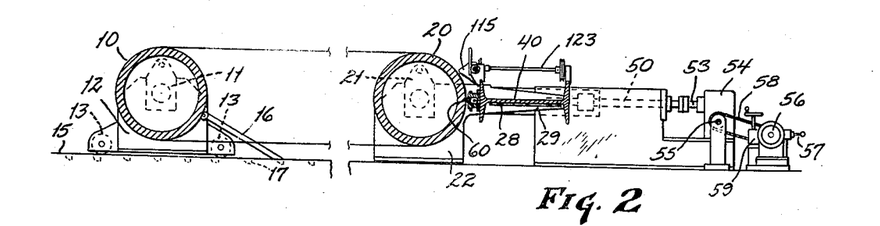
Fig. 2 is a section on the line 2—2 in Fig. 1.
Figure 3:
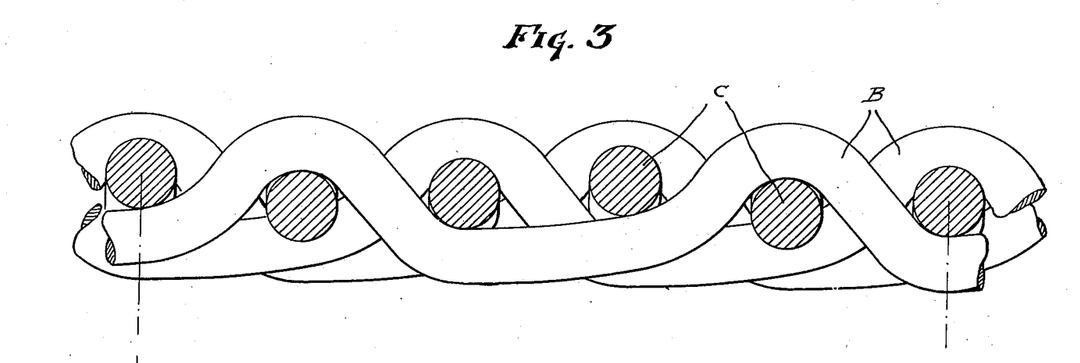
Fig. 3 is a section on an enlarged scale through the fabric on a plane parallel to the warp wires, showing the relation of the warp and weft knuckles before the fabric is treated in accordance with the method of the present invention.
Figure 4:
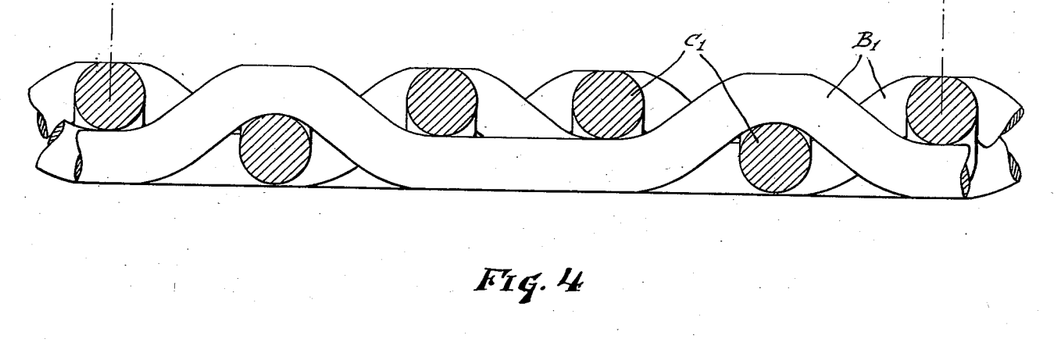
Fig. 4 is a similar vertical section illustrating the fabric of Fig. 3, after it has been treated in accordance with the method of the present invention.

In Figs. 1 and 2 of the drawings, A indicates a woven wire fabric joined by a seam into an endless belt, the fabric being in the condition it comes from the loom. This condition may be such as is indicated in Fig. 3, where B designates one of the warp wires and C the weft wires in a twill weave. It will be seen that these weft wires are respectively below the top plane and above the bottom plane tangent to the warp knuckles; Fig. 4 illustrates the same fabric after it has been treated by my method and apparatus about to be described, to flatten it, so that the topmost and bottommost regions of the weft wires C—1 are respectively in the same plane as the top and bottom of the knuckles of the warp wires B—1.

In Figs. 1 and 2, I have illustrated a usual belt stretching table, the stretching apparatus comprising two large rolls 10 and 20, adjustably spaced so that the belt may pass around them and be maintained taut. As shown, the roll 10 has journal boxes 11 mounted in a movable carriage 12. This carriage is shown as having rollers 13 resting on parallel tracks 15. These carriages are manually positioned and held in various locations by struts 16 engaging periodically located recesses 17 in the tracks. This provides a rough adjustment for belts of different length.

The roll 20 has its bearing boxes 21 mounted in carriages 22 which are slidable along the trackways 15 for a short distance. Devices, hereinafter described, are provided for moving and holding these carriages 22 to tension the belt.

The fabric may be joined into a belt by a suitable seam either before or after it has been passed about the rolls, as desired. If the seam is formed before mounting the belt on the rolls, the rolls (which have their bearing boxes removably mounted in the carriages 12 and 22) are raised from the carriages and supported by any suitable mechanism, while the belt is passing over the rolls endwise thereof.

Means are provided for rotating the roll 20, for instance, in a motor 30, driving reduction gearing 31 and 32, to a final shaft 33, which aligns with and is coupled to a gudgeon extending from the roll. The motor with its reduction gearing is mounted on a platform 35 and is capable of sliding movement parallel with the trackways 15, corresponding to the shifting movement of the roll 20.

Extending across the apparatus on the outer side of the roll 20, and parallel with it, is a stiff horizontal beam 40, shown as an I-beam, with its web in a horizontal plane. This beam may rest near its ends on ledges 28 on extensions 29 of the standards 22. The I-beam 40 is adjusted toward the roll 20 by a pair of jack screws 42 (Fig. 1), threaded in ears carried by the bracket extension 29.

The adjustment of the roll 20, heretofore mentioned, is effected by rotatable screws 50, mounted in fixed brackets 51, threadingly engaging extensions 52 of the carriage 22.

To operate the two screws 50 in unison, I couple each of them with an aligned shaft 53, which is connected by bevel or worm gearing in a housing 54 to a transverse shaft 55. This shaft 55 is driven in one direction or the other, as may be desired, by a motor 56, controlled by a reversing switch 57, and operating reduction gearing which is connected to the shaft by a sprocket chain. Automatic operation of the motor to maintain tension on the belt will be described later.

The I-beam 40 carries on its vertical face, adjacent the roll 20, a rotatable roll of small diameter engaging the web and pressing against it throughout its width to flatten the web as it travels by the rotation of the roll 20, which acts as the resistor to the pressure. This device will now be described, with reference to Figs. 2, 6 and 8 to 12, inclusive.

Figures 8, 9, 10:
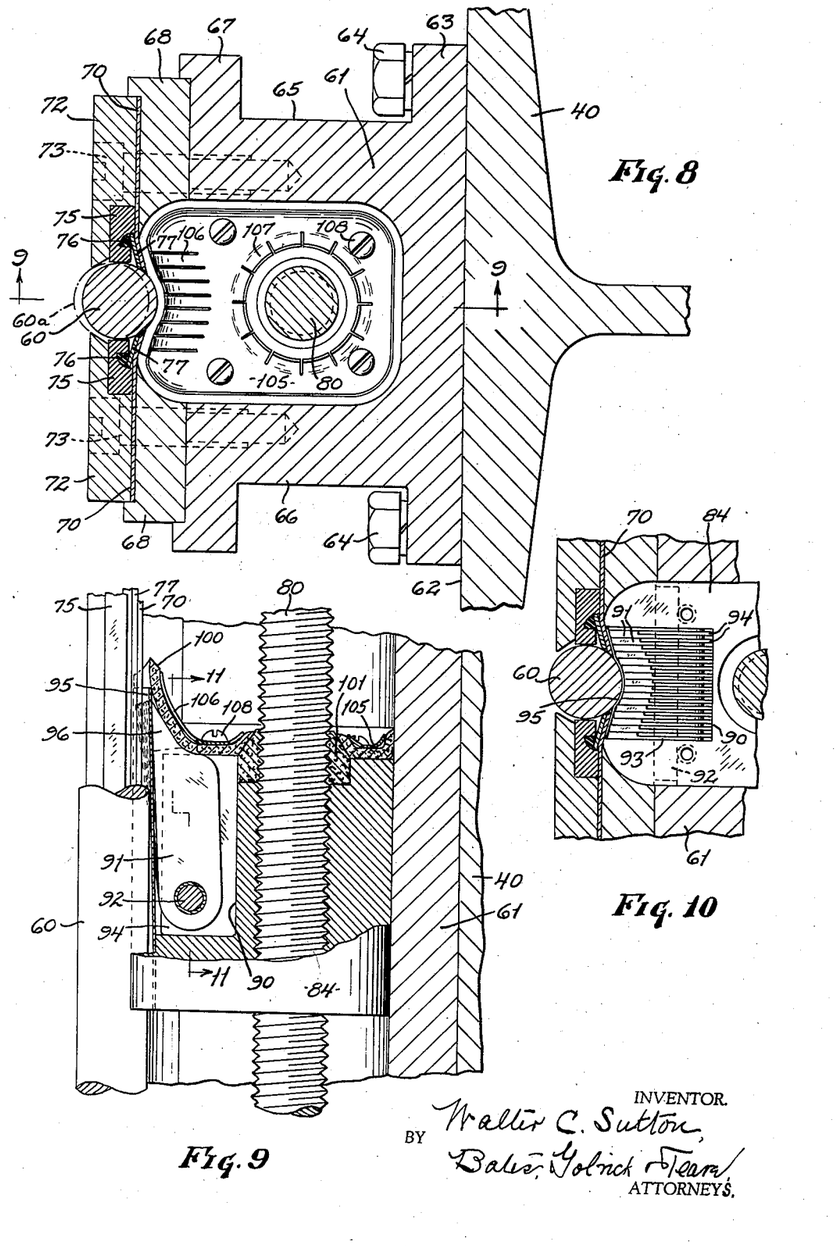
Fig. 8 is a vertical section on an enlarged scale taken on the line 8—8 in Fig. 6.
Fig. 9 is a vertical section taken on the line 9—9 in Fig. 8.
Fig. 10 is a partial section corresponding to Fig. 8, but showing the construction after packing material and spring plate have been removed.

The pressing roll, above referred to, designated 60, is a cylindrical rod, which extends horizontally in the plane of the axis of the roll 20, for the full width of maximum belt, which may be carried. This rod is movably carried in a horizontal slot in the front face of a long, closed housing 61, secured to the vertical face 62 of the I-beam, as shown in Figs. 2 and 8. The housing 61 may, for the most part, be a casting. It has a back portion 63, with projecting edges for bolts 64 (Fig. 8) which secure it to the I-beam, then it has top and bottom walls 65 and 66 which terminate in a face portion 67, to which is secured a pair of spaced parallel plates 68, which project downwardly and upwardly, respectively, toward the roll 60. The plates 68 extend the full length of the housing and on their outer faces are mounted leather plates 70, which extend downward and upward, respectively, into engagement with the roll 60. These leather plates are clamped in place by metal plates 72, secured against their outer faces by bolts 73 extending through the plates 72, 70 and 68 into the upper and lower walls of the casting 61.

The plates 72 are separated by a distance less than the diameter of the roll 60, so that they form a limit for the movement of that roll toward the roll 20, such outer limit being indicated by the broken line 60a, in Fig. 8, an operating position of the roll 60 being there shown in full lines.

Figures 11, 12, 13, 14, 15:
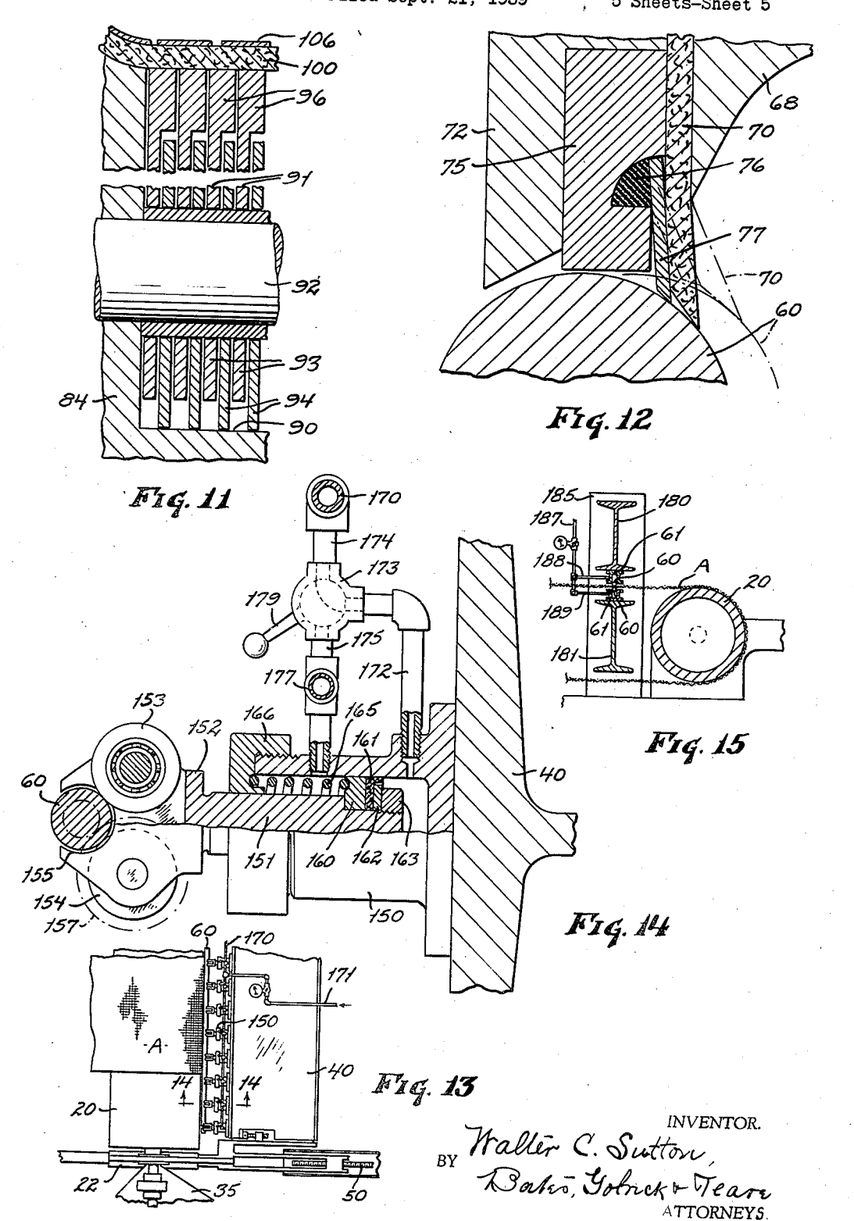
Fig. 11 is a section taken on the line 11—11 in Fig. 9.
Fig. 12 is a section similar to a portion of Fig. 8, but on an enlarged scale and showing the longitudinally extending packing strip.
Fig. 13 is a fragmentary top plan view of apparatus showing a modified construction.
Fig. 14 is a section on an enlarged scale taken on the line 14—14 in Fig. 13.
Fig. 15 is a sectional view illustrating a further modified construction of apparatus for treating the fabric according to my method.

Above and below the roll 60, long non-abrasive material strips 75 fit into rabbeted edges in the plates 72 and form top and bottom bearings for the roll. These strips 75, as illustrated in Figs. 8 and 12, have recesses in their rear portions occupied by long elastic rods 76, preferably of rubber, each of which carries a plate 77 bearing against roll 60 and supporting the free edge of the leather packing plate 70.

The construction described makes an air-tight connection with the inner portion of the roll 60, while that roll is free to move a short distance toward the roll 20. Compressed air supplied to the housing 61 (which is effectively closed at its end portions, as hereinafter explained) forces the rod 60 outwardly against the web with considerable pressure, so that the roll 60 rolls in cooperation with the roll 20 and flattens the web as it travels.

Within the housing 61 are two rotatable screws 80, journalled at their inner ends in bearing blocks 81, within the housing (Fig. 6) and extending at their outer portions through the ends 69 of the housing. These screws extend threadingly through blocks 84 in the housing. These blocks carry packing which make an air-tight connection with the roll 60. Compressed air is admitted through an opening 85 into the space within the housing between the two blocks 84, and thus acts to press that portion of the roll 60 which is between these blocks against the belt.

Figures 5, 6, 7:
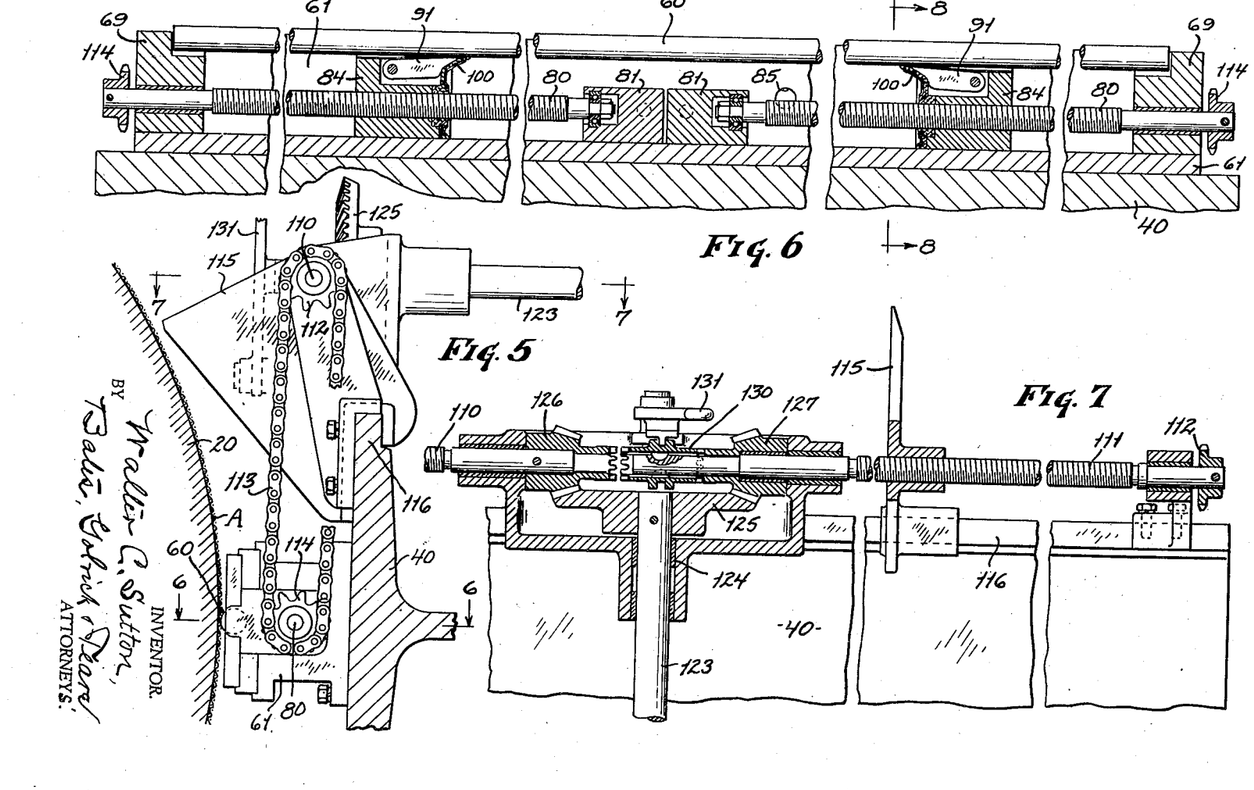
Fig. 5 is a vertical section on an enlarged scale taken on the line 5—5 in Fig. 1.
Fig. 6 is a horizontal section taken on the line 6—6 in Fig. 5.
Fig. 7 is a horizontal section taken substantially on the plane indicated by the line 7—7 in Fig. 5.

Rotation of the screws 80 moves the blocks 84 inwardly or outwardly, so that they may be adjusted to bring their packing in line with the marginal edges of the belt, so that the compressed air is acting on that portion of the roll 60 which extends entirely across the roller, but not on the idle end portions of the roller, if the belt has less than the maximum width.

The means by which I obtain an efficient packing between the blocks 84 and the roll 60 is illustrated in Figs. 6, 8, 9, 10 and 11. Mounted in a recess 90 in each block 84 are a number of parallel plates 91, side by side, pivotally mounted on a cross-rod 92. Each plate has a narrow inward extension 93, and these are interleaved with thin plates 94 carried by the block. The inward extensions of the plates 91 are of different length, so that the outside edges of the set present a concave contour, as shown in Fig. 10, which, in the intermediate region, corresponds to an arc of the roll 60. A thin flexible plate 95 lies across the ends of the plates 91. The projecting portions of this plate, above and below the roll 60, bear against the free portions of the leather backing 70, heretofore mentioned.

The plates 91 have their free end portions 96 bevelled on their inner edges, and this bevel is engaged by a suitable leather packing 100 leading from a leather hub 101 threaded on the screw shaft 80. This packing 100 engages the walls of the housing and is held in place by a metal plate 105, held to the block 84 by screws 108. This plate is formed, as shown in Fig. 8, slitted adjacent the rod 60 to provide spring tongues 106 pressing on the leather packing 100, and causing the latter to cam the plates 91 outwardly to exert pressure on the packing strips 70. The plate 105 also is slitted about an opening which surrounds the screw shaft 80, providing radial tongues 107 pressing against the hub packing about the screw shaft.

It results from the construction described that an air-tight adjustable end member is provided for each end of the air chamber within the housing 61. The leather packing 70, heretofore mentioned, makes an air-tight connection above and below, with the roll 60 throughout the length of the roll so that that packing is active for the distance between the blocks 84. Accordingly, a closed air chamber is provided between the blocks 84 which maintains compressed air under comparatively heavy pressure, thus forcing the roll 60 against the web with sufficient force to flatten it from the form shown in Fig. 3 to the form shown in Fig. 4, as the web travels. In this manner, I am able to maintain the small roll 60 in effective and uniform pressure against the web, and thus flatten the web uniformly throughout its width.

As the position of the blocks 84 is hidden from direct observation, I provide the following external mechanism for indicating such position to the operator. Extending across the apparatus directly above the housing 61, are a pair of aligned horizontal screws 110 and 111, Figs. 1 and 7. These screws at their outer ends have sprocket wheels 112, while sprocket chains 113 (Fig. 5) extend around these wheels and around corresponding sprocket wheels 114 on the ends of the screw shafts 80. Threaded on the screws 110 and 111 are indicating fingers 115, which are slidably guided by the vertical flange 116 of the I-beam 40. The fingers 115 are located in correspondence with the active edge of the packing on the blocks 84, and hence if the screws are rotated, such movement automatically moves the blocks 84 and the fingers 115, so that they indicate the new position of the blocks. These screws 110 and 111 thus serve the double purpose of actually moving the blocks 84 to change their position, and of indicating such changed position.

The means for driving the screws 110, 111, to move the blocks 84 and their indicators, comprises a hand belt 120 located in a convenient position for manual engagement by the operator. This hand belt extends over an idle pulley 121, and over a driving pulley 122 on a shaft 123, the latter shaft operating the screws, as about to be described.

Referring to Fig. 7, it will be seen that the shaft 123 is mounted in a bearing 124, carried by the I-beam 40, and has on its inner end a bevel gear 125. This bevel gear meshes with a bevel pinion 126 tight on the shaft 110, and a bevel pinion 127 loose on the shaft 111. An intermediate slidable sleeve 130 is splined to the shaft 111, and this sleeve has clutch teeth at its opposite ends adapted to mesh with teeth on the ends of the hub of the pinion 126 or 127, as the case may be. The sleeve 130 may be shifted by a suitable manual lever 131.

With the parts in the position shown in Fig. 7, when the shaft 123 is rotated, it drives the screw shaft 110, through the fixed pinion 126 in one direction, and drives the loose pinion 127 in the other direction. The loose pinion being connected by the clutch with the shaft 111, rotates the shaft in the opposite direction to the shaft 110.

It follows that with the clutch 130 in the position shown in Fig. 7, the rotation of the shaft 123 by the shifting of the hand belt 120, in one direction or the other, carries the two blocks 84 and the two pointers 115, toward or from each other, as the case may be. This enables the spacing of the blocks and pointers corresponding to the width of the web.

When it is desired to cause the two blocks and their two pointers to move as a set toward the right or left, to accommodate belts of the selected width, but differently positioned on the rolls, the clutch lever 131 is thrown to the left (in Fig. 7) thereby clutching the sleeve 130 to the hub of the pinion 126, which is fixed on the shaft 110 and then that pinion drives both shafts 110 and 111 as a unit. As the threading on these shafts is in the same direction, this operation will shift the blocks and fingers to right or left while preserving their spacing.

Accordingly, when the clutch lever 131 is in one position, the operation of the hand belt 120 accommodates the blocks and pointers to the position of the belt on the roll 20; whereas, when the clutch lever is in the other position, the blocks and fingers are caused to approach or separate to accommodate belts of different widths, as heretofore explained.

I have heretofore referred to the motor 56, Fig. 1, as operable when desired to shift the position of the roll 20. This motor is also employed to maintain the constant tension on the belt during operation. In effecting this, I provide a suitable automatic hydraulic drive unit 59, acting according to the torque on the transverse shaft 55, which will energize the drive when the torque decreases to a predetermined amount. Accordingly, the drive unit operates to move the roll toward the right, thereby stretching the belt until the tension on the belt increases the torque load to the predetermined maximum which stops or slows the drive unit. This provides for maintaining the belt in a constant tension, though the flattening action on the web, as hereinafter described, tends to slacken the belt. Such slackening is taken up by a slight outward shifting of the roll 20, the roll 60 and its supporting I-beam 40 being carried with it.

The compressed air may be suplied to the housing 61 by any suitable means. In Fig. 1 I have illustrated at 140 a motor-driven compressor supplying air by a line 141 and through a regulator 142 to the port 85 in the housing. I have found that with a roll 60 having a diameter of 3/4" air pressure of between 200 and 250 lbs. per square inch operates very satisfactorily on phosphor bronze fabrics having an original thickness of about .02 inch. The air pressure, however, will vary according to the characteristics of the fabric to be flattened.

In Figs. 13 and 14 I have shown a modification of the apparatus for pressing the roll 60 against the roll 20. In this modification, I secure to the upright face of the I-beam 40 a horizontal row of cylinders 150. In each cylinder is a plunger 151 carrying a bifurcated head 152 in which are mounted a pair of rolls 153 and 154. These rolls bear against the roll 60, which, in this case, seats in recesses 155 in the heads 152. These recesses are somewhat more than a semi-circle in extent, so that the body of the head extends over beyond the vertical diameter of the roll 60, as illustrated in Fig. 14, retaining it against lateral displacement. To prevent longitudinal displacement, I may form a narrow annular groove in the roll 60 and provide one of the rolls 154 with a narrow flange 157 to occupy the annular groove.

Each plunger 151 is reduced in diameter at its inner end and there receives a piston 160, against which is a leather packing 161. A washer 162 presses against the packing, and a nut 163 screwed onto the plunger holds the washer, packing and piston in place. A compression spring 165 surrounds the plunger and is compressed between the piston 160 and a cap 166 screwing into the cylinder. The spring, therefore, tends to hold the plunger in its innermost position.

To press the rod 60 in this embodiment uniformly against the web, I provide a pressure pipe 170 extending across all the cylinders and supplied with oil through the pipe 171. Each cylinder is provided with an intake pipe 172 leading to the casing 173 of a three-way valve. This casing is connected by a pipe 174 with the manifold pipe 170. A pipe 175 leads from the three-way valve through a T-fitting to the cylinder in advance of the packing, and a leakage return pipe indicated at 177 leads through a check valve back to the oil supply.

The three-way valve has a plug capable of one-quarter turn manually by a handle 179. When the plug is in the position shown in Fig. 14, the fluid under pressure passes from the manifold pipe 170 to the cylinder back of the plunger, and forces the plungers forwardly to maintain the rod 60 under proper pressure against the web. When the valve handle 179 is lifted upwardly one-fourth of a turn, the passageway from the manifold is shut off and the pipe 172 is vented through the pipe 175 back to the oil supply. Any leakage past the piston packing 161 is prevented from accumulating in the front portion of the cylinder by reason of the venting pipe 177.

It will be seen that the apparatus shown in Figs. 13 and 14 operates to maintain the roll 60 effectively pressed against the web throughout the width of the web. Although the roll is small in diameter, the pressure heads are so close together that there is a minimum deflection of the rod between them. In employing this system of furnishing pressure to the roll 60, I utilize the same means heretofore described, of automatically maintaining a tension on the web A by rotation of the screws 51 connected to the carriage 22 of the roll 20, the screws being automatically rotated by the motor 56 (Fig. 1) under the torque control device.

While I have shown the roll 20 as the resistor engaging the inside of the belt and opposing the pressure of the roll 60 in the embodiments of Figs. 1 to 14, inclusive, a special roll might be provided within the belt for that purpose, using the rolls 10 and 20, and the mechanism associated with the roll 20, to progress the belt and maintain its tension. However, as the stretching table including the rolls 10 and 20 and the operating mechanism for the latter is likely to be already installed in the plant where the belt is produced, I prefer to avail myself of such existing roll 20 as the resistor, avoiding the expense of an extra roll.

Fig. 15 illustrates another modification of the invention. In this embodiment, in place of opposing the pressure on the roll 60 by the roll 20, I arrange two of these small rolls 60 on opposite sides of the web in advance of the roll 20. Each of such rolls 60 is confined within a housing 61, similar to that heretofore described. Such two housings are carried, one on the underside of a vertical I-beam 180, and the other on the top of a vertical I-beam 181. The I-beam 180 lies above the upper reach of the web A, and the I-beam 181 extends between the two reaches. These I-beams may be supported at their ends by suitable standards indicated at 185. Air pressure to the two housings 61 comes through a conduit 187, branching into two pipes 188 and 189, to supply the two housings.

The construction within these housings in the embodiment of Fig. 15, and the operation of the movable end blocks may be identical with that shown in Fig. 6, heretofore described. Suitable indicators corresponding to the pointers 115, in Figs. 1 and 7, operatively connected with the end blocks, will be employed, and may be operated by mechanism similar to that shown in Fig. 1, and heretofore described.

I have indicated the pressing arrangement for the two smaller rolls on opposite sides of the belt, in Fig. 15, as corresponding to the embodiment of the construction of Figs. 1 to 12. However, it will be readily understood that the support and operation of the two coacting rolls 60 may be by means of two rows of individual plungers, each row being similar to the row illustrated in Figs. 13 and 14.

It will be seen that all forms of my apparatus indicated in the drawings and described, have in common the employment of a comparatively small roll which is pressed substantially throughout its effective length against the web, the opposite side of which is maintained to resist the pressure, so that if the web travels it will be flattened. The resistor to any pressure roll may be the progressing roll itself of the stretching apparatus, or some additional roll, or it may be another one of the narrow rolls on the opposite side of the web.

By reason of the roll 60 being somewhat flexible, and being pressed by uniform pressure, either entirely or at close intervals, throughout its effective length against the resisting roll, any flexing of the resisting roll due to the pressure is immaterial, as that simply results in the roll 60 being pressed correspondingly further forward so that the fabric is rolled to a uniform thickness across the web.

By employing a roll of smaller diameter,—I have found the diameter of ¾" satisfactory—not only can I make the engaging line of that roll stand strictly parallel with the engaging line of the resisting roll, but I obtain a more effective pressure on the wire, as such pressure is confined at any one time in a very narrow zone across the web, and hence more force acts at one time on each cross-sectional plane of the wires engaged than if the roll were larger and its region of osculation extended for a greater distance along the wires, particularly the warp wires.

In operation after the belt has been installed, the tension applied, the air supplied to the pressing roll, and power connected for rotating the driving roll of the stretching frame, the operation is automatic. The amount of air pressure, as well as the amount of tension, and the number of passes of the fabric through the pressing device, varies considerably with different thickness of the belt and different material employed.

I have found that with belts of phosphor-bronze wire, of some sizes and meshes commonly used by paper mills, a tension of about 20 lbs. per inch of width of the belt, and an air pressure of about 200-lbs. per square inch, is very satisfactory.

It is preferable for the cloth to make two or more successive passes under the pressure roll. In fact, the pressing operation may continue until each region of the belt has travelled a number of times past the pressing roll, which gradually compresses the web uniformly across the belt until the resultant web has a uniform thickness and all of the knuckles come to the bounding top and bottom planes.

I have found that in order to secure the maximum firmness in the cloth after rolling, it is desirable to pass it through the rolls in the direction opposite to that in which it was woven. This forces the weft wires against the steeper end of the warp crimps and locks the two firmly together.

It will be seen that my apparatus, whatever its form, is readily adaptable for use in connection with an existing stretching apparatus involving a table, trackways, two rolls, means for driving one of the rolls, and a tension control. In any case, the additional equipment is carried in such a firm manner that a very small roll is effectively pressed against the web, truly parallel therewith, and operates to supply pressure uniformly to the progressing web, thus gradually flattening and stretching it as it travels. The stretching which is incident to the use of the invention is apparent in Figs. 3 and 4 where the distance between the lines D and E represents the spacing between six weft wires before treatment, and where the distance between lines D and F represents the space between the same weft wires after treatment.

While I have described my invention particularly as applied to the manufacture of woven wire fabric, it is to be understood that the apparatus may be desired to be utilized for treating material other than wire fabric, such as sheet metal, paper, fibrous materials, or any other material which is reduced in thickness by its passage between two rolls.

Reference is made to my divisional application, Serial No. 345,965, filed July 17, 1940, for claims on the method of making woven wire belts herein described and illustrated, and to my divisional application, Serial No. 345,964, filed July 17, 1940, for claims on the belt itself.

I claim:

1. In a machine for rolling woven wire fabric, the combination of a rotatable roll adapted to engage the fabric, and means for applying pressure to the roll for a region of variable lengths intermediate of its ends.

2. In a rolling machine, the combination of a pair of coacting rolls, and means to apply pressure to one of the rolls at regions which are at least adjacent throughout its active length to cause such roll to accommodate itself to any flexing of the opposing roll.

3. In an apparatus for treating woven wire fabric, the combination of a comparatively small relatively flexible roll adapted to be extended across the fabric, means for engaging the other side of the fabric to resist the pressure of said roll, and means for forcing said small roll against the fabric and supporting such roll intermediate of its length to prevent the flexing of such roll.

4. In a rolling machine, the combination with a bodily movable roll free at its ends, of fluid pressure means for applying force to a portion of the face of the roll.

5. In an apparatus for treating woven wire fabric, the combination of a comparatively small relatively flexible roll adapted to be extended across the fabric, means for engaging the other side of the fabric to resist the pressure of said roll, a fluid pressure chamber in communication with the roll on the opposite side thereof from the fabric, and means for supplying fluid pressure to said chamber.

6. In a rolling machine, means for applying fluid pressure directly to a portion of the face of a roll, and means for varying the extent of the area exposed to pressure.

7. In an apparatus for treating woven wire fabric, the combination of a long fluid pressure chamber having a slot in its face, a shiftable roll located along said slot, packing carried by a chamber engaging the roll lengthwise thereof on opposite sides of an inwardly exposed intermediate portion, and means for admitting fluid under pressure to the chamber.

8. In an apparatus for treating woven wire fabric, the combination of means for supporting and progressing the fabric, a roll adapted to bear against the fabric, a chamber extending lengthwise of the roll and adapted to contain fluid under pressure acting on the roll on the opposite side from the fabric, a movable block within the chamber for limiting the effective length thereof, and means for supplying fluid under pressure to the chamber.

9. In a rolling machine, a roll, a chamber partially surrounding the roll, movable heads within the chamber, fluid pressure side seals between the sides of the chamber and the roll, and fluid pressure head seals on the movable heads in coaction with the chamber, side seals, and roll.

10. In a rolling machine, a roll, a chamber partially surrounding the roll, movable heads within the chamber, means for moving the heads within the chamber, and means for sealing the chamber to retain fluid pressure.

11. In a rolling machine, a roll, a chamber partially surrounding the roll, movable heads and seals within the chamber, the heads and seals adapted to conform to various positions of the roll relative to the chamber.

12. In a rolling machine, including a roll partially enclosed in a fluid pressure chamber, means for controlling the length of the roll exposed to the fluid pressure, and means for indicating the length of the roll so exposed.

13. An apparatus for treating woven wire fabric, comprising two coacting rolls, means for rotating one of the rolls whereby the fabric is fed, means for causing fluid pressure to act against a portion of the distant face of one roll to force it toward the fabric and flatten the same as the fabric travels, said last-mentioned means comprising a chamber and a movable end member for the chamber to limit the length of the roll which is acted on directly by the air pressure, an external indicator connected with the movable end member to indicate the position of the latter, and means for correspondingly moving the end member and indicator.

14. In an apparatus for treating woven wire fabric, the combination of means for supporting and progressing the fabric, a roll adapted to bear against the fabric, a chamber in communication with the roll on the opposite side from the fabric, movable blocks within the chamber for limiting the effective ends thereof, means for supplying fluid under pressure to the chamber between the blocks to force the roll toward the fabric, and means external of the chamber for indicating the position of said blocks.

15. In an apparatus for treating woven wire fabric, the combination of an elongated fluid pressure chamber having a slot in its face, a shiftable roll located in said slot, packing carried by a chamber engaging the roll lengthwise thereof on opposite sides of an inwardly exposed intermediate portion, means for admitting fluid pressure to an intermediate region of the chamber, movable end blocks within the chamber carrying packing engaging the walls of the chamber and the roll to vary the length of the region adapted to receive compressed fluid acting on the roll, and mechanism extending from the outside into the chamber and operable externally for moving the blocks.

16. In an apparatus for treating fabric, the combination of an elongated chamber adapted to extend cross-wise of the fabric having a slot in its face adjacent the fabric, a small roll occupying the slot and movable toward and from the fabric, movable end blocks within the chamber having packing coacting with the roll, mechanism connected to the end blocks and extending outside the chamber for simultaneously moving the end blocks to cause them to approach each other or separate.

17. In an apparatus for treating fabric, the combination of an elongated chamber adapted to extend cross-wise of the fabric having a slot in its face adjacent the fabric, a small roll occupying the slot and movable toward and from the fabric, movable end blocks within the chamber having packing coacting with the roll, mechanism connected to the end blocks and extending outside the chamber for operating the end blocks to cause them to approach each other or separate, said means comprising a pair of rotatable screws engaging the end blocks, a driving member, a connection between said driving member and said screws including gearing, and a clutch adapted to drive the screws simultaneously in the same direction or in the opposite direction according to the position of the clutch.

18. In an apparatus for treating woven wire fabric, the combination of a roll adapted to engage the fabric, a fluid pressure chamber extending lengthwise of the roll and having an elongated opening leading to the face of the roll on the side opposite the fabric, movable end members for the chamber to limit the length of the roll which is acted on directly by the fluid pressure, two external indicators connected with the movable end members to indicate their position, and means for correspondingly moving the end members and the indicators either toward and from each other or as a set toward the right or left as desired.

19. In an apparatus of the class described, the combination of a roll, a chamber in communication with the roll, movable blocks within the chamber forming a fluid-tight connection therewith to provide effective ends thereof, means for supplying fluid under pressure to the chamber between the blocks to force the roll outwardly, rotatable screws connected to the blocks to move them lengthwise of the chamber, and parts connected with said screws extending outside of the chamber to enable their external manipulation.

20. In an apparatus for treating woven wire fabric, the combination of means for supporting and progressing the fabric, a roll adapted to bear against the fabric, a chamber in communication with the roll on the opposite side from the fabric, movable blocks within the chamber for limiting the effective ends thereof, means for supplying fluid under pressure to the chamber between the blocks to force the roll toward the fabric, and means external of the chamber for indicating the position of said blocks, said means comprising rotatable screws connected respectively to the blocks and the indicators, and transmission mechanism between the screws of the blocks and the screws of the indicators.

21. In an apparatus of the character described, the combination of an elongated chamber having an elongated slot in one face, a bodily movable roll extending along the slot, packing strips carried by the chamber and engaging the roll on opposite sides of an inwardly exposed longitudinal intermediate portion thereof, a movable end block within the chamber, packing means carried by the block and cooperating with the strips to seal the chamber, means carried by the end block for supporting said packing means and comprising a series of movable plates carried by the end block, and means whereby the fluid pressure in the chamber may force such packing means toward the roll.

22. In a machine for treating woven wire belts, the combination with a roll about which the belt may extend, means for rotating the roll to progress the belt, means for flattening the belt fabric as it progresses, and automatic means for tensioning the belt as it elongates through the flattening.

23. In a wire cloth belt processing machine, wire belt supporting rolls, a flattening roll cooperating with one of the supporting rolls, and means for controlling the tension in the wire belt while it passes between the flattening roll and the supporting roll.

24. In a rolling machine, one relatively stiff roll of large diameter journaled in bearings at its ends, one relatively flexible roll of small diameter without end journals, and means for forcing the small roll toward the large roll by fluid pressure applied over a portion of the face of the small roll.

25. In an apparatus of the character described, the combination with a movable roll adapted to engage one side of a woven wire fabric, of a roll engaging the opposite side, the latter roll being of comparatively small diameter and mounted within a slot in the face of an elongated hollow housing extending parallel to the axes of the rolls, a stiff beam for supporting said housing and means for admitting fluid under pressure to the housing.

26. An apparatus for treating woven wire belts comprising a pair of parallel rolls about which the belt extends, means for rotating one of the rolls to progress the belt, a stiff beam extending parallel with the axes of the rolls and means carried by the beam for supporting a comparatively small roll parallel with such axes and forcing it under fluid pressure against one of the rolls first mentioned, and at the same time supporting it intermediate of its length to maintain it strictly parallel with the face of the roll with which it cooperates.

27. In an apparatus of the character described, the combination with a rotatable and bodily movable roll adapted to engage one side of a woven wire fabric, of a roll engaging the opposite side, the latter roll being of comparatively small diameter and mounted within a slot in the face of an elongated hollow housing extending parallel to the axes of the rollers, a stiff beam for supporting said housing, means for admitting fluid under pressure to the housing, and means for maintaining tension on the fabric by moving the first mentioned roll.

28. An apparatus for treating woven wire belts comprising a pair of rolls about which the belt extends, means for rotating one of the rolls to progress the belt, a stiff beam extending parallel with the axes of the rolls, means carried by the beam for supporting a comparatively small roll parallel with such axis and forcing it under fluid pressure against one of the rolls and at the same time supporting it intermediate of its length to prevent the flexing of the rod, and mechanism for shifting one of the belt rolls and an automatic device for operating said mechanism dependent upon the tension upon the belt, whereby the belt is maintained taut notwithstanding its elongation through the flattening.

29. In an apparatus for treating woven wire fabric, the combination of a comparatively small relatively flexible floating roll adapted to be extended across the fabric, means for engaging the other side of the fabric to resist the pressure of said roll and a series of pressure devices acting on said roll at intervals throughout its length to press the roll against the fabric and prevent flexing of the roll.

30. In a rolling machine, one relatively stiff roll of large diameter, one relatively flexible roll of small diameter, a multiplicity of supports contacting the face of the small roll, and fluid pressure means for applying force through the supports to the face of the small roll.

31. In an apparatus for treating woven wire belts, the combination of a roll adapted to engage one side of the belt, a beam on the opposite side of the belt, a series of cylinders carried by the beam, a plunger in each cylinder having a head with a pair of rolls thereon, a roll of small diameter extending lengthwise of the beam and resting against the rolls on the plunger heads, means for supplying fluid under pressure simultaneously to the different cylinders to force the small roll against the fabric.

32. In an apparatus for treating woven wire belts, the combination of a pair of rolls adapted to support the belt, means for rotatively driving one of the rolls to progress the belt, a pair of beams one extending between the reaches of the belt and one outside the belt, a pair of comparatively small rolls extending along opposite sides of the belt respectively, and movably supported by the beams, fluid pressure means for forcing said rolls toward the interposed fabric while maintaining the rolls longitudinally against outward flexure.

33. In a rolling machine, means for applying fluid under pressure directly to a portion of the face of a roll, and means for varying the extent of the area exposed to the fluid under pressure.

34. In an apparatus for treating woven wire fabric, the combination of a comparatively large roll, a comparatively small relatively flexible roll adapted to be extended across the fabric, on the other side from the larger roll and parallel therewith, said large roll engaging the other side of the fabric to resist the pressure of said small roll, and means for forcing said small roll against the fabric and supporting such roll intermediate of its length to prevent the flexing of such roll.

35. An apparatus for treating woven wire fabric, comprising two movable rolls adapted to stand on opposite sides of the fabric, two devices extending lengthwise of the rolls and adapted to force them by fluid pressure toward each other while so supporting one of the rolls that it will accommodate itself to any flexing of the other roll.

36. In a wire cloth belt processing machine, the combination of a pair of supporting rolls spaced apart and snugly embraced by the belt of the woven wire cloth, means cooperating with one of the supporting rolls to flatten the belt between such cooperating members, and means for automatically separating the supporting rolls as the flattening elongates the belt.

37. In a machine for treating woven wire belts, the combination of a pair of supporting rolls spaced apart and adapted to hold a belt substantially taut about them, a comparatively small flattening roll adapted to bear against the belt in a region where it engages one of the supporting rolls, means for intermediately supporting the small flattening roll, and means for automatically separating the supporting rolls as the flattening action elongates the belt.

38. In a machine for treating woven wire cloth to flatten the same, the combination of a pair of rolls spaced apart and journaled in shiftable carriages, whereby the spacing may be varied to cause the belt to be taut, means for rotating one of said rolls to progress the belt, means bearing on the belt in the direction parallel to the rotated roll and opposed by such roll to gradually flatten the belt, as such roll is rotated, and means to shift the carriages of one of the rolls as the belt becomes elongated by the flattening operation whereby the belt is maintained taut.

39. In the machine for flattening a woven wire belt, the combination of a pair of rolls about which the belt is adapted to loop and be held taut, means coacting with the belt to flatten it, a pair of movable carriages in which one of said rolls is journaled, a common shaft geared with both carriages in a manner to enable the rotation of the shaft to advance the two carriages, a motor for driving said shaft, and a controlling device for the motor depending on the torque on the shaft which results from the tension of the belt.

WALTER C. SUTTON.